(12) United States Patent
Lin et al.

(10) Patent No.: US 8,687,287 B2
(45) Date of Patent: Apr. 1, 2014

(54) PROJECTION APPARATUS

(75) Inventors: Ming-Kuen Lin, Yunlin County (TW); Tsung-Hsun Wu, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 165 days.

(21) Appl. No.: 13/451,567

(22) Filed: Apr. 20, 2012

(65) Prior Publication Data

US 2012/0300318 A1  Nov. 29, 2012

(30) Foreign Application Priority Data

May 27, 2011  (TW) .............................. 100118624 A

(51) Int. Cl.
*G02B 3/02* (2006.01)
*G02B 9/34* (2006.01)
*G02B 9/12* (2006.01)

(52) U.S. Cl.
CPC ....................................... *G02B 9/34* (2013.01)
USPC ............ 359/715; 359/716; 359/771; 359/784

(58) Field of Classification Search
USPC ................................. 359/715, 716, 771–792
See application file for complete search history.

(56) References Cited

U.S. PATENT DOCUMENTS 7,486,450 B2 * 2/2009 Kawakami et al. ........... 359/781

FOREIGN PATENT DOCUMENTS

CN            101995645 A       3/2011

* cited by examiner

*Primary Examiner* — Jack Dinh

(57) ABSTRACT

The present invention provides a projection apparatus including an image generation device and a projection lens. The projection lens is disposed between a light valve of the image generation device and a projection screen, and the projection lens includes a plurality of lenses. The lenses include a first lens, a second lens and a third lens, and the first lens, the second lens and the third lens are aspherical lenses. An effective focal length of the projection lens is between 5 mm and 8 mm, and a sum of the effective focal length of the projection lens and a number of the lenses is between 14 and 17.

14 Claims, 4 Drawing Sheets

PROJECTION APPARATUS

BACKGROUND OF THE INVENTION

1. Field of the Invention

The present invention relates to a projection apparatus, and more particularly, to a projection apparatus having a projection lens with at least three aspherical lenses.

2. Description of the Prior Art

With the progress of science and technology, projection apparatuses gradually play an important role in use of family, entertainment or business. Traditional projection apparatus is composed of an image generation device and a projection lens. The image generation device generates an image, and the image is enlarged and projected on a projection screen.

Since the lenses of the projection lens is manufactured to have spherical surface before, the projection lens requires having many lenses to solve problems of aberration and image blur, so that size and weight of the projection lens is unable to be minimized. Please refer to FIG. 1, which is a schematic diagram illustrating a projection lens according to the prior art. As shown in FIG. 1, the projection lens 10 of the prior art uses fourteen lenses 12 to eliminate aberration and distortion of image in order to be suitable to the image generation device having a diagonal line larger than 0.4 inches, and lens surfaces of each lens 12 are spherical lens surfaces, so that number of the lenses 12 of the projection lens 10 is rapidly increased when a focal length is gradually reduced. However, the projection apparatus is tended to have characteristics of light weight and small size, so that the excess of the lenses of the projection lens would limit the volume of the projection device to be unable to be reduced. Furthermore, the weight of the projection device would likely be too heavy and causes user burden.

Accordingly, to provide a projection apparatus with large projection view angle, small size and light weight is an important objective in this field.

SUMMARY OF THE INVENTION

It is therefore an objective of the present invention to provide a projection apparatus to improve the problem of the projection apparatus having too heavy weight resulted from reducing the focal length.

According to a preferred embodiment of the present invention, a projection apparatus is provided, and the projection apparatus is used to project an image on a projection screen. The projection apparatus includes an image generation device and a projection lens. The image generation device is used to project a light with the image. The image generation device has a light valve, and the light emits out from the light valve. The projection lens is disposed between the light valve and the projection screen, and the projection lens includes a plurality of lenses. The lenses have an optic axis, and the light passes through the lenses and is projected on the projection screen to generate a projection image, wherein the lenses comprises a first lens, a second lens, and a third lens, and the first lens, the second lens and the third lens are aspherical lenses. The lenses satisfy a first relationship expressed by: 14 mm≤(EFL+N)≤=17 mm, and a second relationship expressed by: 5 mm≤EFL≤8 mm, wherein EFL is an effective focal length of the projection lens, and N is a number of the lenses.

The projection apparatus of the present invention uses at least three aspherical lenses to have the effective focal length being between 5 mm and 8 mm, so that the projection apparatus has the effects of short focal length and large projection view angle. Also, a sum of the effective focal length and the number of the lenses of the projection apparatus is between 14 and 17, so that the number of the lenses is limited to be between 6 and 12, and the number of the lenses of the projection apparatus can be effectively reduced.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be detailed as follows. The preferred embodiments of the present invention are illustrated in the accompanying drawings with numbered elements to elaborate the contents and effects to be achieved.

Figure 1:
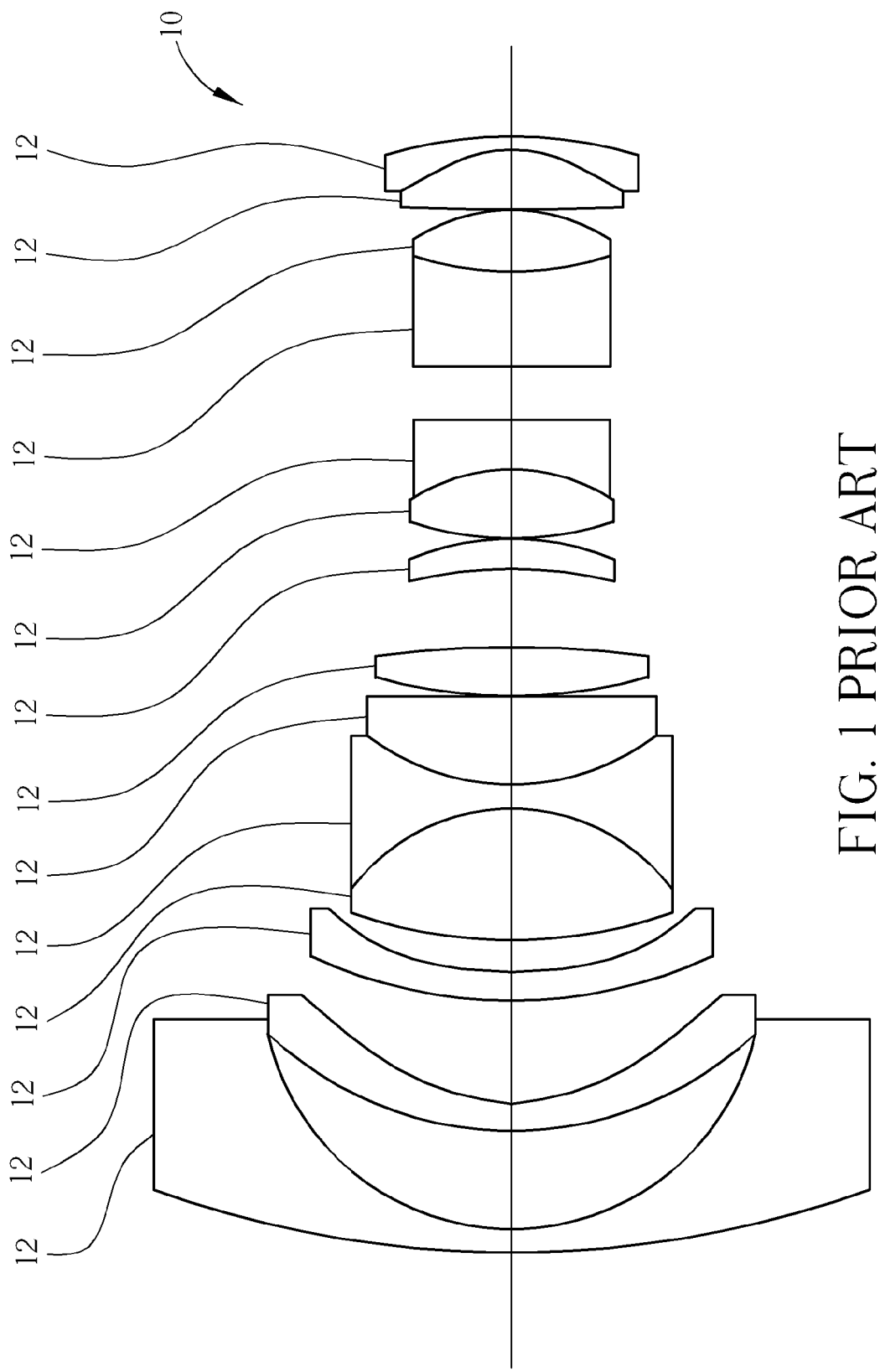
FIG. 1 is a schematic diagram illustrating a projection lens according to the prior art.
Figure 2:
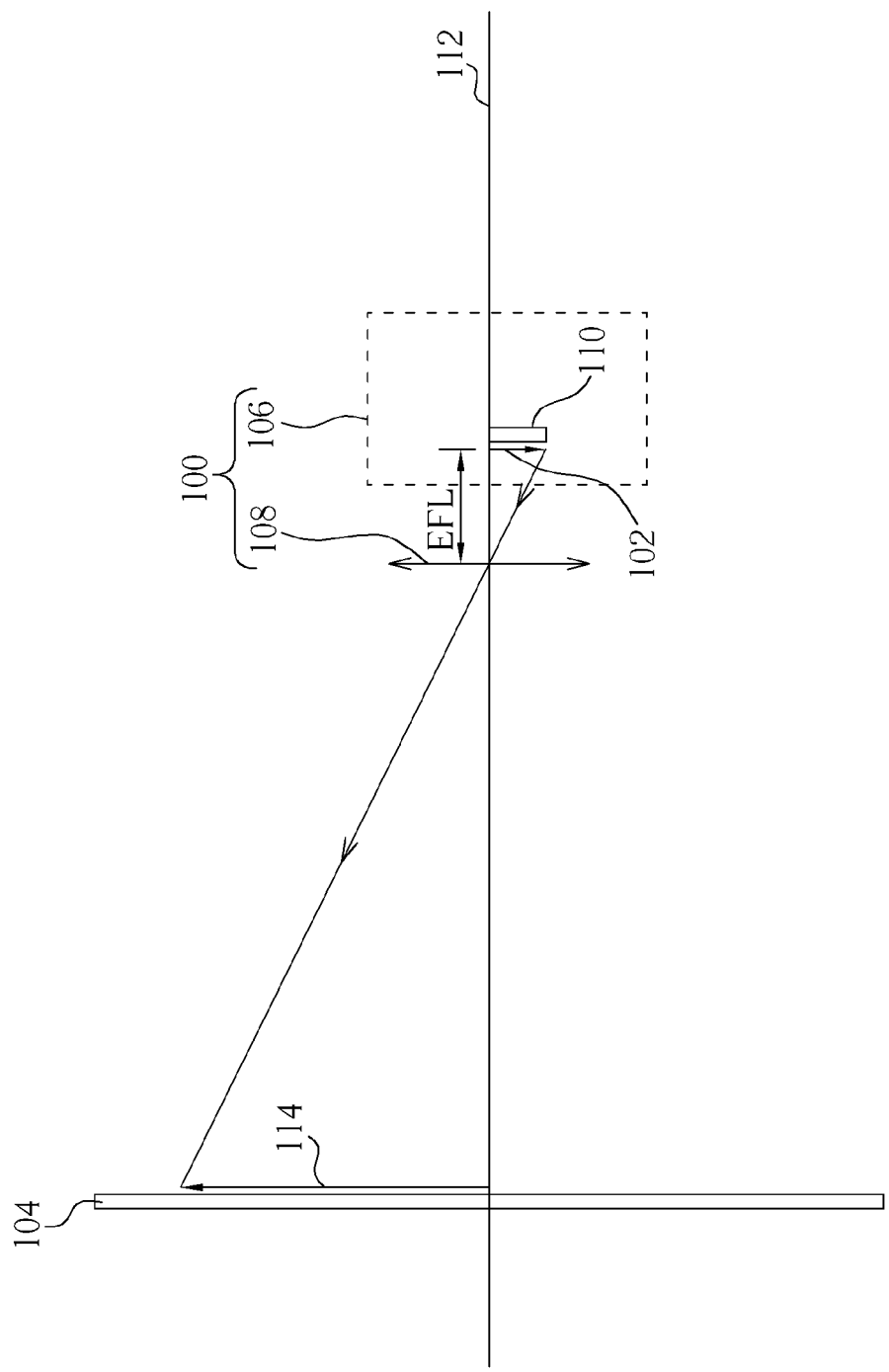
FIG. 2 is a schematic diagram illustrating a projection apparatus according to the present invention.

Please refer to FIG. 2, which is a schematic diagram illustrating a projection apparatus according to the present invention. As shown in FIG. 2, the projection apparatus 100 is used to project an image 102 on a projection screen 104, and the projection apparatus 100 includes an image generation device 106, and a projection lens 108. The image generation device 106 is used to generate a light with the image 102. The image generation device 106 has a light valve 110, and the light emits out from the light valve 110. In this embodiment, the image generation device 106 can be a light engine including light source and several kinds of optical devices, and the light valve 110 can be an LCD panel or a digital micro-mirror device (DMD), but the image generation device and the light valve of the present invention is not limited herein. The projection lens 108 is disposed between the projection screen 104 and the light valve 110, and includes a plurality of lenses. The lenses have an optic axis 112, and the light emitted from the light valve 110 can be projected on the projection screen 104 by the projection lens 108 and to show an enlarged projection image 114 on the projection screen 104. In addition, the projection lens 108 has an effective focal length satisfying a first relationship expressed by: 14 mm≤(EFL+N)≤17 mm, and a second relationship expressed by: 5 mm≤EFL≤8 mm, wherein EFL is an effective focal length of the projection lens, and N is a number of the lenses. In other words, the number of the lenses is between 6 and 12. As we can see from the above-mentioned description, the projection apparatus 100 of the present invention uses a method of one-time image formation to image the inverted image 102 onto the projection screen 104 and to form the upright and enlarged projection image 114. Furthermore, a center of the projection image 114 and a center of the light valve 110 are respectively disposed at two sides of the optic axis 112, and a length of a diagonal line of the light valve 110 is substantially larger than 0.4 inches.

Figure 3:
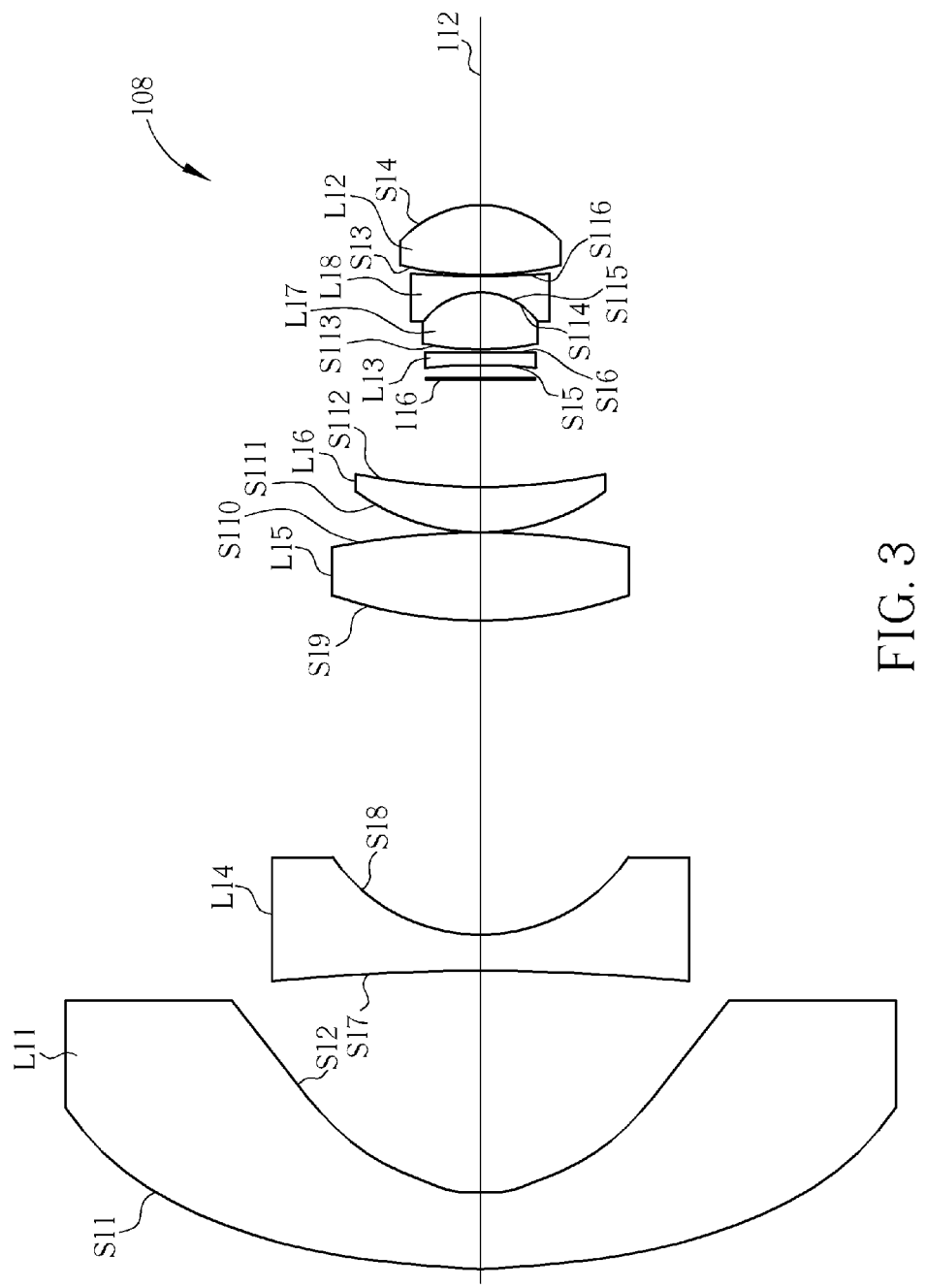
FIG. 3 is a schematic diagram illustrating a projection lens according to a first preferred embodiment of the present invention.

In order to detail the projection lens of the present invention, please refer to FIG. 3 together with FIG. 2. FIG. 3 is a schematic diagram illustrating a projection lens according to a first preferred embodiment of the present invention. As shown in FIG. 3, in this embodiment, the lenses can be divided into a first lens L11, a second lens L12, a third lens L13, a fourth lens L14, a fifth lens L15, a sixth lens L16, a seventh lens L17, and an eighth lens L18, wherein the first lens L11, the second lens L12 and the third lens L13 are aspherical lenses, and the fourth lens L14, the fifth lens L15, the sixth lens L16, the seventh lens L17 and the eighth lens L18 are spherical lenses. An arranged sequence of the lenses from a side of the lenses close to the projection screen 104 to a side of the lenses close to the light valve 110 is the first lens L11, the fourth lens L14, the fifth lens L15, the sixth lens L16, the third lens L13, the seventh lens L17, the eighth lens L18, and the second lens L12. The first lens L11 is one of the lenses closest to the projection screen 104, and the second lens L12 is one of the lenses closest to the light valve 110. Furthermore, the projection lens 108 further includes an aperture stop 116 disposed between the sixth lens L16 and the third lens L13, and a distance between the aperture stop 116 and the sixth lens L16 is larger than a distance between the aperture stop 116 and the third lens L13. The third lens L13 is one of the aspherical lenses closest to the aperture stop 116. In this embodiment, the first lens L11 is a convex-concave lens, and has a convex lens surface S11 facing the projection screen 104 and a concave lens surface S12 facing the light valve 110. The second lens L12 is a double convex lens, and has a convex lens surface S13 facing the projection screen 104 and a convex lens surface S14 facing the light valve 110. The third lens L13 is a concave-convex lens, and has a concave lens surface S15 facing the projection screen 104 and a convex lens surface S16 facing the light valve 110. The fourth lens L14 is a double concave lens, and has a concave lens surface S17 facing the projection screen 104 and a concave lens surface S18 facing the light valve 110. The fifth lens L15 is a double convex lens, and has a convex lens surface S19 facing the projection screen 104 and a convex lens surface S110 facing the light valve 110. The sixth lens L16 is a convex-concave lens, and has a convex lens surface S111 facing the projection screen 104 and a concave lens surface S112 facing the light valve 110. The seventh lens L17 is a double convex lens, and has a convex lens surface S113 facing the projection screen 104 and a convex lens surface S114 facing the light valve 110. Preferably, the seventh lens L17 can be a doublet lens. The eighth lens L18 is a double concave lens, and has a concave lens surface S115 facing the projection screen 104 and a concave lens surface S116 facing the light valve 110. The concave lens surface S115 of the eighth lens L18 and the convex lens surface S114 of the seventh lens L17 facing the light valve 110 coincide with each other so as to have the same curvature radius. In addition, in this embodiment, at least one of the lenses L11-L18 is made of plastic material. The optical datum and the disposition relationships of the lens surfaces of the first lens L11 through the eighth lens L18 are listed in Table 1, but the present invention is not limited thereto. In Table 1, thickness represents a distance between a surface corresponding to a row and a surface corresponding to the next row, which is a distance between a lens surface of the row and a lens surface of the next row.

TABLE 1

| Lens | Lens surface | Curvature radius (mm) | Thickness (mm) | Lens material |
|---|---|---|---|---|
| L11 | S11 | 55.71 | 6.58 | 480R |
|  | S12 | 13.52 | 18.94452 |  |
| L14 | S17 | −194.7 | 3.6 | S-LAH66 |
|  | S18 | 15.8 | 26.5148 |  |
| L15 | S19 | 37.26 | 7.5 | S-BAL14 |
|  | S110 | −77.19 | 0.1123838 |  |
| L16 | S111 | 18.13 | 4 | S-NBH5 |
|  | S112 | 47.65 | 9.250681 |  |
| Aperture stop |  |  | 1.245941 |  |
| L13 | S15 | −33.34 | 1.05 | L-LAH84M |
|  | S16 | −378 | 0.2 |  |
| L17 | S113 | 20.64 | 4.92 | S-FPL51 |
|  | S114 | −6.05 | 0 |  |
| L18 | S115 | −6.05 | 1.4 | S-LAH60 |
|  | S116 | 57.93 | 0.1015791 |  |
| L12 | S13 | 18.15 | 6 | S-FSL5M |
|  | S14 | −9 | 18.5 |  |

In addition, the convex lens surface S11 and the concave lens surface S12 of the first lens L11, the two convex lens surface S13, S14 of the second lens L12 and the concave lens surface S15 and the convex lens surface S16 of the third lens L13 are aspherical lens surfaces, and a surface polynomial of each aspherical lens surface can be represented by:

$$z = \frac{ar^2}{1 + \sqrt{1 - a^2(b+1)r^2}} + cr^4 + dr^6 + er^8 + fr^{10}$$

wherein z is a sag of each aspherical lens surface; r is an aperture radius of each aspherical lens surface; a is an inverse of a curvature radius of a top of each aspherical lens surface; b is a conical coefficient of each aspherical lens surface; and c, d, e, f are respectively aspherical coefficients of fourth order, sixth order, eighth order and tenth order. In this embodiment, the curvature radii, the conical coefficients and the aspherical coefficients of the convex surface S11 and the concave lens surface S12 of the first lens L11, the two convex lens surface S13, S14 of the second lens L12 and the concave lens surface S15 and the convex lens surface S16 of the third lens L13 are listed in Table 2, but the present invention is not limited thereto.

TABLE 2

| Lens surface | b | c | d | e | f |
|---|---|---|---|---|---|
| S11 | −1.519E+01 | 2.550E−06 | 3.278E−09 | −4.164E−12 | 3.192E−15 |
| S12 | −6.668E−01 | −1.538E−05 | −5.110E−08 | 2.063E−10 | −3.928E−13 |
| S15 | −8.798E+01 | 2.234E−04 | 1.245E−06 | −9.167E−08 | 5.578E−11 |
| S16 | 0.000E+00 | 4.196E−04 | −8.062E−06 | 1.429E−07 | −5.416E−09 |
| S13 | −1.934E+00 | −1.989E−04 | 2.798E−06 | −3.245E−08 | 1.991E−10 |
| S14 | −6.003E−01 | −2.790E−05 | −3.526E−07 | −7.187E−10 | 1.474E−11 |

According to the above-mentioned datum, in this embodiment, the effective focal length (EFL) of the projection lens 108 is substantially 6.95 mm, and the projection view angle of the projection lens 108 is substantially 60 degrees. Furthermore, the projection lens 108 in this embodiment only uses three aspherical lenses to have an effect of the effective focal length being between 5 mm and 8 mm, and the total number of the lenses in the projection lens 108 is only eight. Accordingly, not only the projection lens 108 has the effect of short focal length, but also the number of the lenses is reduced to reduce the total weight of the projection lens 108.

Figure 4:
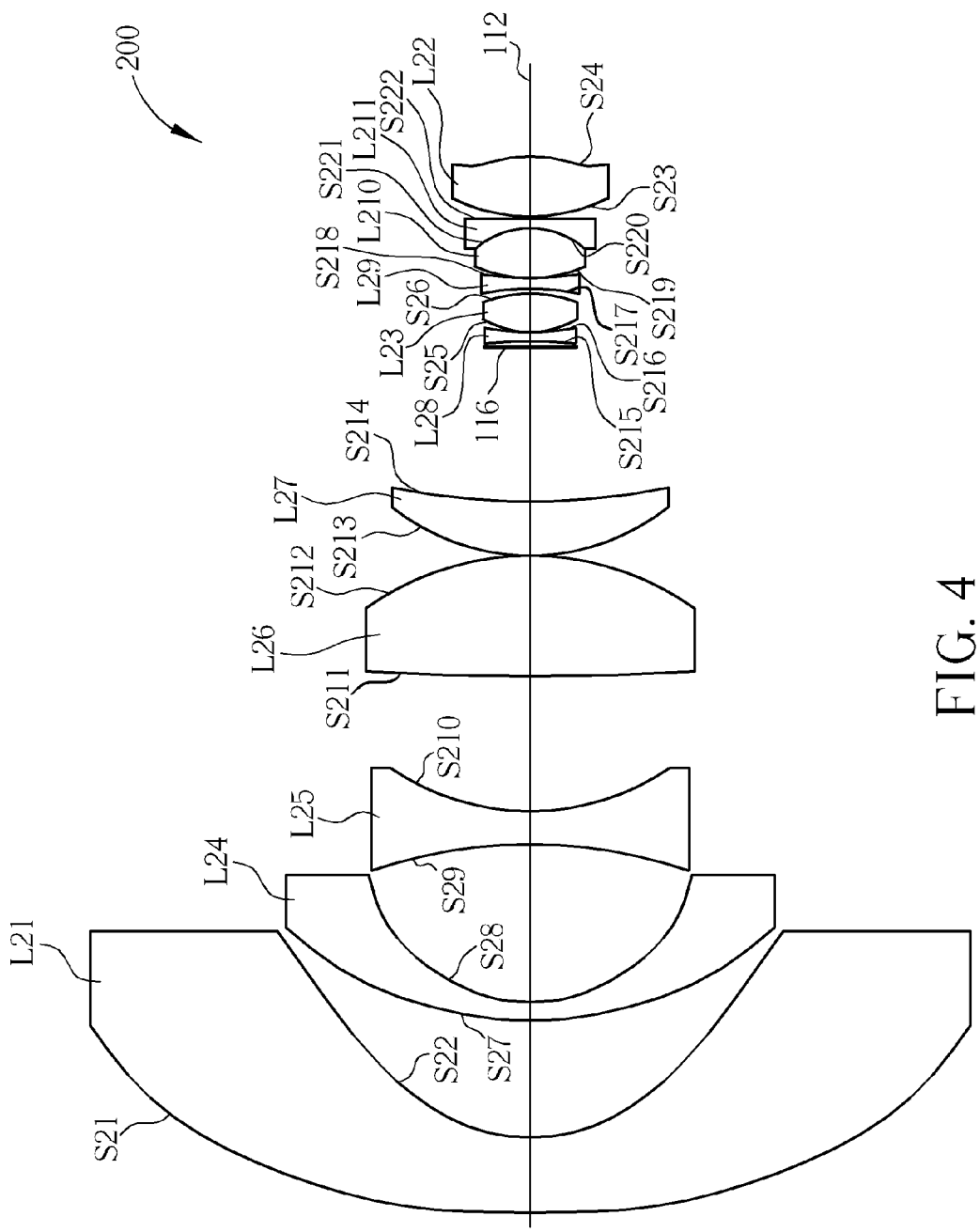
FIG. 4 is a schematic diagram illustrating a projection lens according to a second preferred embodiment of the present invention.

The projection lens in the present invention is not limited to the above-mentioned embodiments. Please refer to FIG. 4, which is a schematic diagram illustrating a projection lens according to a second preferred embodiment of the present invention. As shown in FIG. 4, in this embodiment, the lenses of the projection lens 200 can be divided into a first lens L21, a second lens L22, a third lens L23, a fourth lens L24, a fifth lens L25, a sixth lens L26, a seventh lens L27, an eighth lens L28, a ninth lens L29, a tenth lens L210, and a eleventh lens L211, wherein the first lens L21, the second lens L22 and the third lens L23 are aspherical lenses, and the fourth lens L24, the fifth lens L25, the sixth lens L26, the seventh lens L27, the eighth lens L28, the ninth lens L29, the tenth lens L210, and the eleventh lens L211 are spherical lenses. An arranged sequence of the lenses from a side of the lenses close to the projection screen 104 to a side of the lenses close to the light valve 110 is the first lens L21, the fourth lens L24, the fifth lens L25, the sixth lens L26, the seventh lens L27, the eighth lens L28, the third lens L23, the ninth lens L29, the tenth lens L210, the eleventh lens L211, and the second lens L22. The first lens L21 is one of the lenses closest to the projection screen 104, and the second lens L22 is one of the lenses closest to the light valve 110. Furthermore, the projection lens 200 further includes an aperture stop 116 disposed between the seventh lens L27 and the eighth lens L28, and a distance between the aperture stop 116 and the seventh lens L27 is larger than a distance between the aperture stop 116 and the eighth lens L28. The third lens L23 is one of the aspherical lenses closest to the aperture stop 116. In this embodiment, the first lens L21 is a convex-concave lens, and has a convex lens surface S21 facing the projection screen 104 and a concave lens surface S22 facing the light valve 110. The second lens L22 is a double convex lens, and has a convex lens surface S23 facing the projection screen 104 and a convex lens surface S24 facing the light valve 110. The third lens L23 is double convex lens, and has a convex lens surface S25 facing the projection screen 104 and a convex lens surface S26 facing the light valve 110. The fourth lens L24 is a convex-concave lens, and has a convex lens surface S27 facing the projection screen 104 and a concave lens surface S28 facing the light valve 110. The fifth lens L25 is a double concave lens, and has a concave lens surface S29 facing the projection screen 104 and a concave lens surface S210 facing the light valve 110. The sixth lens L26 is a double convex lens, and has a convex lens surface S211 facing the projection screen 104 and a convex lens surface S212 facing the light valve 110. The seventh lens L27 is a convex-concave lens, and has a convex lens surface S213 facing the projection screen 104 and a concave lens surface S214 facing the light valve 110. The eighth lens L28 is a double concave lens, and has a concave lens surface S215 facing the projection screen 104 and a concave lens surface S216 facing the light valve 110. The ninth lens L29 is a double concave lens, and has a concave lens surface S217 facing the projection screen 104 and a concave lens surface S218 facing the light valve 110. The tenth lens L210 is a double convex lens, and has a convex lens surface S219 facing the projection screen 104 and a convex lens surface S220 facing the light valve 110. Preferably, the tenth lens L210 can be a doublet lens. The eleventh lens L211 is a concave-flat lens, and has a concave lens surface S221 facing the projection screen 104 and a flat lens surface S222 facing the light valve 110. The concave lens surface S221 of the eleventh lens L211 and the convex lens surface S220 of the tenth lens L210 facing the light valve 110 coincide with each other so as to have the same curvature radius. In this embodiment, the optical datum and the disposition relationships of the lens surfaces of the first lens L21 through the eleventh lens L211 are listed in Table 3, but the present invention is not limited thereto. In Table 3, thickness represents a distance between a surface corresponding to a row and a surface corresponding to the next row, which is a distance between a lens surface of the row and a lens surface of the next row.

TABLE 3

| Lens | Lens surface | Curvature radius (mm) | Thickness (mm) | Lens material |
|---|---|---|---|---|
| L21 | S21 | 82.674 | 6.6 | 480R |
|  | S22 | 14.232 | 10.3187 |  |
| L24 | S27 | 32.02 | 1.78 | S-LAH66 |
|  | S28 | 14.78 | 13.71786 |  |
| L25 | S29 | −44.29 | 2.95 | S-LAH51 |
|  | S210 | 22.31 | 11.88214 |  |
| L26 | S211 | 210.837 | 10.5 | S-BAL12 |
|  | S212 | −24.82 | 0.1558341 |  |
| L27 | S213 | 19.467 | 4.84 | S-NBH5 |
|  | S214 | 70.347 | 13.82782 |  |
| Aperture stop |  |  | 0.2259584 |  |
| L28 | S215 | −35.914 | 0.65 | S-LAH66 |
|  | S216 | 15.62 | 0.1 |  |
| L23 | S25 | 8.462 | 3.38 | L-BSL7M |
|  | S26 | −10.28 | 0.4940567 |  |
| L29 | S217 | −16.416 | 0.65 | S-LAH66 |
|  | S218 | 19.68 | 0.1 |  |
| L210 | S219 | 10.495 | 4.56 | S-FPL51 |
|  | S220 | −7.37 | 0 |  |
| L211 | S221 | −7.37 | 0.82 | S-LAH60 |
|  | S222 | infinity | 0.1 |  |
| L22 | S23 | 24.13 | 5.33 | L-BAL42 |
|  | S24 | −12.175 | 16 |  |

In addition, the convex lens surface S21 and the concave lens surface S22 of the first lens L21, the two convex lens surface S23, S24 of the second lens L22 and the two convex lens surface S25, S26 of the third lens L23 are aspherical lens surfaces, and according to the above-mentioned surface polynomial, the curvature radii, the conical coefficients and the aspherical coefficients of the convex surface S21 and the concave lens surface S22 of the first lens L21, the two convex lens surface S23, S24 of the second lens L22 and the two convex lens surface S25, S26 of the third lens L23 in this embodiment are listed in Table 4, but the present invention is not limited thereto.

TABLE 4

| Lens surface | b | c | d | e | f |
|---|---|---|---|---|---|
| S21 | −7.815E+00 | 3.769E−06 | 1.413E−10 | −4.141E−13 | 3.216E−16 |
| S22 | −6.864E−01 | −5.104E−06 | −4.883E−08 | 1.796E−10 | −3.010E−13 |

TABLE 4-continued

| Lens surface | b | c | d | e | f |
|---|---|---|---|---|---|
| S25 | 1.572E+00 | −3.222E−04 | −1.552E−05 | 6.183E−07 | −2.979E−08 |
| S26 | −3.930E+00 | −2.783E−05 | 1.016E−05 | −5.557E−07 | 1.953E−08 |
| S23 | 5.089E+00 | 1.817E−04 | 3.564E−07 | 1.489E−09 | 9.106E−11 |
| S24 | −1.698E+00 | 1.657E−04 | 3.993E−06 | 4.985E−08 | 1.974E−10 |

According to the above-mentioned datum, in this embodiment, the effective focal length (EFL) of the projection lens 200 is substantially 5.22 mm, and the projection view angle of the projection lens 200 is substantially 67.2 degrees. Furthermore, the projection lens 20 in this embodiment only uses three aspherical lenses to have an effect of the effective focal length being between 5 mm and 8 mm, and the total number of the lenses in the projection lens 200 is only eleven. Accordingly, not only the projection view angle of the projection lens 200 can be raised by reducing the effective focal length, but also the total weight of the projection lens 200 can be avoided from being increased too much.

In summary, the projection apparatus of the present invention uses at least three aspherical lenses to have the effective focal length being between 5 mm and 8 mm, so that the projection apparatus has the effects of short focal length and large projection view angle. Also, a sum of the effective focal length and the number of the lenses of the projection apparatus is between 14 and 17, so that the number of the lenses is limited to be between 6 and 12, and the number of the lenses of the projection apparatus can be effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projection apparatus used to project an image on a projection screen, the projection apparatus comprising:
   an image generation device, used to project a light with the image, the image generation device having a light valve, and the light emitting out from the light valve; and
   a projection lens, disposed between the light valve and the projection screen, the projection lens comprising:
      a plurality of lenses, having an optic axis, the light passing through the lenses and being projected on the projection screen to generate a projection image, wherein the lenses comprises a first lens, a second lens, and a third lens, and the first lens, the second lens and the third lens are aspherical lenses;
      wherein the lenses satisfy a first relationship expressed by: 14 mm≤(EFL+N)≤=17 mm, and a second relationship expressed by: 5 mm≤EFL≤8 mm, wherein EFL is an effective focal length of the projection lens, and N is a number of the lenses.

2. The projection apparatus according to claim 1, wherein a center of the projection image and a center of the light valve are respectively disposed at two sides of the optic axis.

3. The projection apparatus according to claim 1, wherein only the first lens, the second lens and the third lens are aspherical lenses.

4. The projection apparatus according to claim 1, wherein the first lens is one of the lenses disposed closest to the projection screen.

5. The projection apparatus according to claim 4, wherein the first lens is made of plastic material.

6. The projection apparatus according to claim 4, wherein the lenses further comprises a fourth lens, wherein the fourth lens is a double concave lens and disposed close to the first lens.

7. The projection apparatus according to claim 1, wherein the first lens is a convex-concave lens.

8. The projection apparatus according to claim 1, wherein in the lenses, the second lens is one of the lenses disposed closest to the light valve.

9. The projection apparatus according to claim 1, wherein the second lens is a convex lens.

10. The projection apparatus according to claim 1, further comprising an aperture stop, disposed between the first lens and the second lens.

11. The projection apparatus according to claim 10, wherein the third lens is disposed between the aperture stop and the second lens.

12. The projection apparatus according to claim 11, wherein the lenses further comprises a doublet lens disposed between the second lens and the third lens.

13. The projection apparatus according to claim 1, wherein the first lens, the second lens and the third lens respectively have two aspherical surfaces.

14. The projection apparatus according to claim 1, wherein a length of a diagonal line of the light valve is larger than 0.4 inches.

* * * * *